United States Patent
Hillman et al.

[15] 3,671,516
[45] June 20, 1972

[54] REVERSE-OSMOSIS MEMBRANES

[72] Inventors: Juanita J. Hillman, Silver Spring, Md.; Raymond H. Horowitz, Willow Springs, Ill.

[73] Assignee: The United States of America as represented by the Secretary of the Interior

[22] Filed: March 2, 1971

[21] Appl. No.: 120,361

[52] U.S. Cl..............................260/229, 210/500, 264/195
[51] Int. Cl........................................C08b 1/02, C08b 3/00
[58] Field of Search..............260/229; 210/500; 264/41, 49, 264/195

[56] References Cited

UNITED STATES PATENTS 2,603,636  7/1952  Martin....................................260/229
3,290,286  12/1966  Kesting....................................264/49

OTHER PUBLICATIONS

Blouin et al., Textile Research Journal, Volume XXVI, No. 4, April, 1956, p. 272–275

*Primary Examiner*—Donald E. Czaja
*Assistant Examiner*—Ronald W. Griffin
*Attorney*—Ernest S. Cohen and William S. Brown

[57] ABSTRACT

Reverse-osmosis membranes are prepared by surface acetylation of cellulose film. A pre-treatment consisting of exposure of the film to high relative humidity, prior to acetylation, is employed to provide superior salt rejection.

4 Claims, No Drawings

REVERSE-OSMOSIS MEMBRANES

Reverse osmosis has attracted considerable interest in the field of purification of saline water. In this process, in excess of the osmotic pressure of the saline water feed solution is applied to the solution separated from purified water by a semipermeable membrane. Pure water is thereby caused to diffuse through the membrane, while the salt molecules or other impurities are retained by the membrane.

Efficiency of the reverse osmosis process depends to a large extent on the nature of the membrane and numerous types of membranes and methods of preparing them have been described in the prior art. Among the more effective of these has been the cellulose acetate membranes described, e.g., in U.S. Pat. Nos. 3,133,132; 3,133,137; and 3,439,074. These prior art membranes are cast from solutions comprising the membrane material and an organic solvent, with or without additional solution components such as water, swelling agents, etc. The membranes may be employed in the reverse osmosis process in the form of a free film or a film deposited on a porous support material.

It has now been found, according to the process of the invention, that a membrane having good flux and high selectivity, and requiring no membrane support material, may be prepared by activation of cellulose film by exposure to conditions of high relative humidity, followed by acetylation to form a thin layer of cellulose acetate on the film.

The cellulose film may vary considerably in size, thickness, configuration and composition, depending on the type of reverse osmosis process in which it is to be used. Uncoated cellophane having a thickness of about 0.5 to 5.0 mil is a suitable base material for preparation of membranes that can be employed in most conventional reverse osmosis devices. The film may be in the form of a flat sheet, tube, hollow fiber, or any form suitable for use in a reverse osmosis unit of a particular design. These designs include plate and frame, spiral-wound module, large tube and small tube (hollow fiber).

Activation of the film is accomplished by pretreatment consisting of exposure of the film to air having a relative humidity of about 80 to 100 percent, preferably about 100 percent, for a period of about 3 to 5 days. Room temperature is usually satisfactory for the activation, but temperatures of about 20° to 30° C may be used.

Acetylation of the activated film is readily accomplished by reaction with conventional acetylation reagents, e.g., acetyl chloride, acetic acid or acetic anhydride in a solvent such as benzene, toluene, or carbon tetrachloride. The preferred acetylation reagent is a solution of acetyl chloride in benzene, the volume ratio of acetyl chloride to benzene being preferably about 1:2. Ambient temperatures are usually satisfactory for the acetylation reaction, but temperatures of 20° to 30° C may be employed. Optimum reaction time will depend on the desired degree of acetylation, which in turn depends on the type of feed solution and the reverse osmosis process employed. Generally, however, suitable reaction times will be about 5 to 15 minutes, preferably about 5 to 8 minutes. These reaction times generally result in a degree of acetylation, or substitution, of about 0.29 to 2.12. The reaction is preferably carried out in an inert atmosphere, such as nitrogen, argon, etc.

Following acetylation, the film is washed thoroughly with water until neutral, as determined by litmus paper. The resulting membranes are directional; hence, the surface of the film that is acetylated must be the one in contact with the feed solution in the reverse osmosis apparatus. Acetylation of the appropriate surface may be readily accomplished by means of conventional procedures, e.g., where the film is in the form of a flat sheet the procedure may consist of (1) immersion of a sealed "envelope" of cellophane into the acetylation medium or (2) floating the cellophane on the surface of the acetylating medium. When the film is in the form of a tube, acetylation is accomplished by simply filling the tube with reagent solution, where the inside of the tube is to be acetylated, or by immersion in the reagent solution when acetylation of the outside of the tube is desired.

The following examples will serve to more particularly illustrate the invention.

EXAMPLES 1 TO 9

The base material in each of these examples consisted of uncoated cellophane film having dimensions of 9 × 16 inches. These films were initially stored at room temperature and 45 percent relative humidity. The films were then acetylated, either directly or after activation for a period of 3–4 days at the relative humidity given in Table 1. Acetylation was accomplished by reaction of one side of the film with a solution of acetyl chloride in benzene (1:2 ratio) at 25° C for the time given in Table 1. The films were then washed with excess water to remove any acetyl chloride and the resulting membranes were tested at 10,000 ppm NaCl at 1,500 psi in a reverse osmosis test cell of the flat sheet type for a period of time given in Table 1. Results, i.e., percent rejection and flux, are also given in Table 1. The marked improvement in rejection obtained by activation, particularly at 100 percent relative humidity, is evident from the data in the table.

TABLE 1

| Example | Activation, percent relative humidity | Acetylation time, min. | Duration of test, hours | Rejection, percent | Flux, GFD |
|---|---|---|---|---|---|
| 1 | None | 30 | 23 | 37.2 | 2.33 |
| 2 | None | 60 | .5 | 34.5 | 1.80 |
| 3 | None | 90 | 23 | 32.0 | 2.06 |
| 4 | 79 | 15 | 4 | 51.9 | 1.77 |
| 5 | 79 | 22.5 | 22 | 77.3 | 0.90 |
| 6 | 79 | 30 | 24 | 71.4 | 1.10 |
| 7 | 100 | 3.75 | 23 | 37.4 | 1.34 |
| 8 | 100 | 7.5 | 25 | 91.9 | 0.62 |
| 9 | 100 | 15 | 2 | 72.5 | 0.69 |

We claim:

1. A method of preparation of a reverse osmosis membrane comprising (1) activation of a cellophane film by pretreatment at a relative humidity of about 80 to 100 percent for a period of about 3 to 5 days and (2) acetylation of the surface of the film by reaction of the film with an acetylation reagent for a period of about 5 to 30 minutes.

2. The method of claim 1 in which the activation is carried out at a relative humidity of about 100 percent.

3. The method of claim 1 in which the acetylation reagent consists of a solution of acetyl chloride in benzene and the time period for acetylation is about 5 to 8 minutes.

4. The method of claim 3 in which the acetylated film is water-washed to remove any acetyl chloride.

* * * * *